United States Patent [19]

Richmond

[11] 3,954,707
[45] May 4, 1976

[54] POLYMERS STABILIZED BY BIS(ALKYLSULFONYL)VINYLANILINES

[75] Inventor: Henry Richmond, Whitehouse Station, N.J.

[73] Assignee: American Cyanamid Company, Stamford, Conn.

[22] Filed: Aug. 11, 1975

[21] Appl. No.: 603,469

[52] U.S. Cl. ............ 260/45.9 QA; 260/293.85; 260/563 R; 260/574; 260/577; 260/588
[51] Int. Cl.² .......................................... C08J 3/20
[58] Field of Search ............ 260/45.9 QA, 45.7 S, 260/45.85 E, 45.85 A, 45.85 N, 574, 577

[56] References Cited
UNITED STATES PATENTS

| | | | |
|---|---|---|---|
| 2,959,617 | 11/1960 | McKusick et al. | 260/576 |
| 3,079,366 | 2/1963 | Boyle et al. | 260/45.85 A |
| 3,134,750 | 5/1964 | Costello et al. | 260/45.9 QA |
| 3,313,771 | 4/1967 | Dressler et al. | 260/45.85 E |
| 3,379,681 | 4/1968 | Kopacki et al. | 260/45.7 S |
| 3,809,674 | 5/1974 | Richmond | 260/45.9 NC |

OTHER PUBLICATIONS

Journal of Organic Chemistry, Vol. 39, No. 10, 1974, pp. 1432 and 1433.

*Primary Examiner*—V. P. Hoke
*Attorney, Agent, or Firm*—Philip Mintz

[57] ABSTRACT

Bis(alkylsulfonyl)vinylanilines of the formula

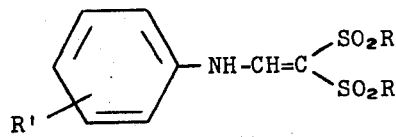

wherein R is alkyl of 1 to 12 carbon atoms or cycloalkyl of 5 or 6 carbon atoms and R' is alkyl, alkoxy, halogen, hydroxy, hydrogen, or

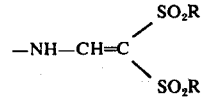

are useful as ultraviolet light absorbers or light stabilizers for polymers.

6 Claims, No Drawings

POLYMERS STABILIZED BY BIS(ALKYLSULFONYL)VINYLANILINES

This invention relates to the use of bis(alkylsulfonyl)-vinylanilines of the formula (I)

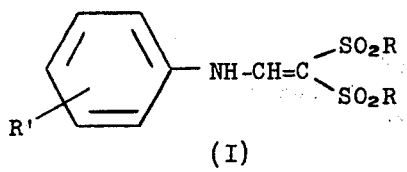

wherein R is alkyl of 1 to 12 carbon atoms or cycloalkyl of 5 or 6 carbon atoms and R' is alkyl, alkoxy, halogen, hydroxy, hydrogen, or

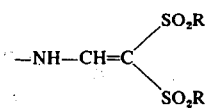

as ultraviolet light absorbers or light stabilizers for polymers.

It is well known that sunlight and other sources of ultraviolet radiation cause degradation of polymers as evidenced by embrittlement or yellowing of plastic articles made therefrom. It is also well known that this degradation can be inhibited by use of ultraviolet light absorbers incorporated in or on such articles. Continuing efforts are being made to discover ever better ultraviolet light absorbers which will be superior to those currently available.

In accordance with the present invention, I have discovered that the above-described compounds are superior ultraviolet light absorbers when used with a variety of polymer substrates. These compounds are very stable to ultraviolet light themselves, ensuring long useful lives for the light stabilizers to protect the polymer substrates. These compounds are also colorless when incorporated in or on polymer articles, a property which is extremely important for articles which are to be colorless or dyed to colors which must not be affected by color in the ultraviolet light absorber. These compounds are also compatible with the polymers in which they are to be used as well as with other additives which may also be present.

Plastic materials which are stabilized against degradation by ultraviolet light using these compounds include in particular polyvinyl chloride, polyvinylidene chloride, and copolymers of vinyl chloride and vinylidene chloride. Other polymers which can be stabilized include polystyrene, polyesters, cellulose acetate, polyvinyl acetate, polyvinyl fluoride, polymethyl methacrylate, and polycarbonates. These compounds may be incorporated in or on such plastic materials by any of the various standard procedures known in the art for such purpose, such as by dry blending the additive with the polymer in powder or granular form followed by molding or extruding, by milling, by immersing the polymer as film, sheet, fibers, etc. in a solution of the additive in an appropriate solvent (as in a dye process), etc.

The polymeric composition should contain an effective stabilizing amount of the bis(alkylsulfonyl)-vinylaniline compound, which amount will depend on the nature of the plastic and the amount of exposure to ultraviolet light to which the plastic will be subjected. Generally, an amount between about 0.1% and 5% by weight of plastic will be found satisfactory and between about 0.1% and 3% will be preferred.

The bis(alkylsulfonyl)vinylaniline may be used in the plastic alone or in combination with other additives, such as fillers, antioxidants, flame retardants, heat stabilizers, pigments, dyes, lubricants, etc.

These compounds can be prepared in several ways, depending upon the particular compound to be prepared and the availability of starting materials. In one procedure, which is generally applicable, ethyl orthoformate (II) and bis(alkyl or cycloalkyl-sulfonyl)methane (III) are mixed with an aniline (IV) and heated until all the alcohol formed during the reaction is distilled from the reaction mixture, producing the desired bis(alkylsulfonyl)vinylaniline (I) as illustrated by the following reaction sequence:

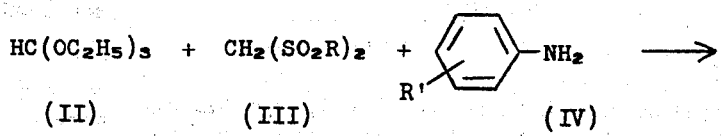

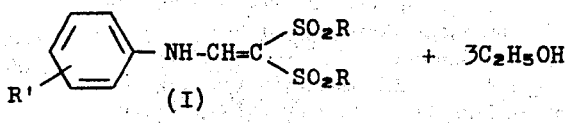

As indicated above, for each mole of (IV), about 1 mole of (II) and about 1 mole of (III) are used to produce, theoretically, 1 mole of (I) and 3 moles of ethanol. To produce the compound wherein R' is

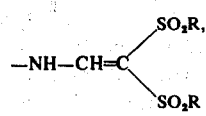

1 mole of phenylenediamine (as compound IV) reacts with about 2 moles of (II) and about 2 moles of (III) giving off about 6 moles of ethanol.

In another procedure, described by Friedman et al., J. Org. Chem. 39, 1432–33 (1974), a bis(alkylsulfonyl)methane (III), specifically bis(methylsulfonyl)methane, is reacted with ethyl orthoformate (II) in the presence of zinc chloride and acetic anhydride to produce 2,2-bis(alkylsulfonyl)vinyl ethyl ether (V), which is then reacted with an aniline (IV) in the presence of an acid catalyst, such as boron trifluoride or p-toluenesulfonic acid, producing the desired bis(alkylsulfonyl)vinylaniline (I) as illustrated by the following reaction sequence:

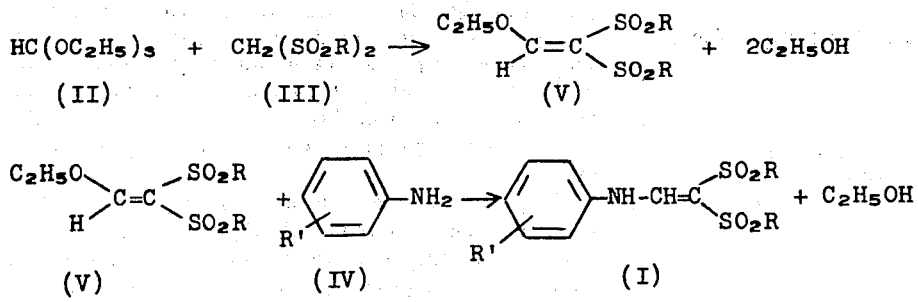

The intermediate, bis(alkylsulfonyl)methane (III) can be prepared by the procedure described in my copending application Ser. No. 439,194 filed Feb. 4, 1974 now U.S. Pat. No. 3,917,714 issued Nov. 4, 1975, as a division of Richmond, U.S. Pat. No. 3,809,674 (especially note column 2, lines 16–28 and in column 3, lines 24–30).

Illustrative of the bis(alkylsulfonyl)vinylanilines (I) useful as ultraviolet light absorbers in accordance with the practice of this invention are those wherein R' is an alkyl, preferably a lower alkyl, such as methyl, ethyl, propyl, butyl, etc., an alkoxy, preferably a lower alkoxy, such as methoxy, ethoxy, propoxy, butoxy, etc., a halogen, such as chlorine or bromine, hydroxy, hydrogen, or

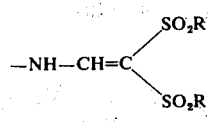

and wherein each R is an alkyl of 1 to 12 carbon atoms, such as ethyl, propyl, butyl, octyl, dodecyl, etc., or a cycloalkyl of 5 or 6 carbon atoms, such as cyclopentyl or cyclohexyl. Such compounds include, but are not limited to 2,2-bis(butylsulfonyl)vinylaniline; 2,2-bis(methylsulfonyl)vinylaniline; 2,2-bis(ethylsulfonyl)vinyl-4-methoxyaniline; 2,2-bis(ethylsulfonyl)vinyl-4-methylaniline; 2,2-bis(butylsulfonyl)vinyl-4-chloroaniline; 2,2-bis(ethylsulfonyl)vinyl-4-butylaniline; 2,2-bis(ethylsulfonyl)vinyl-4-hydroxyaniline; 2,2-bis(octylsulfonyl)vinyl-4-methylaniline; 2,2-bis(dodecylsulfonyl)vinyl-4-methylaniline; 2,2-bis(dodecylsulfonyl)vinyl-4-butoxyaniline; 2,2-bis(cyclohexylsulfonyl)vinyl-4-methoxyaniline; N,N'-bis[2,2-bis(ethylsulfonyl)vinyl]p-phenylenediamine; 2,2-bis(cyclohexylsulfonyl)vinyl-4-ethylaniline; and the like.

This invention is further illustrated by the following examples of a few preferred embodiments thereof.

EXAMPLE 1

Ten grams (0.05 mole) of bis(ethylsulfonyl)methane, prepared by the procedure described in Cronyl "Sulfones. I. Methods for the Preparation of Certain Alkanes, Alkenes, Acids and Lactones with Bis-(ethylsulfonyl)-methane" in J. Am. Chem. Soc., vol. 74, page 1225 (see p. 1228), published 1952, was mixed with 7.4 grams (0.05 mole) of ethyl orthoformate and 6.4 grams (0.05 mole) of p-chloroaniline and the mixture was heated at 95°–145°C. (pot) during which time about 7 milliliters of ethanol distilled off. The reaction mixture was then further heated at 150°–160°C. for 1 hour and then cooled. The solid reaction product was then washed with cold ethanol, and recrystallized from ethanol to give 7.3 grams of 2,2-bis(ethylsulfonyl)vinyl-4-chloroaniline, melting point 173°–175°C. having the structural formula

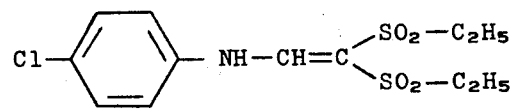

EXAMPLES 2–6

By a procedure similar to that of Example 1, except for the replacement of p-chloroaniline by the below-named anilines, the following compounds were also prepared.

EXAMPLE 2

Using aniline, 2,2-bis(ethylsulfonyl)vinylaniline, melting point 118°–120°C. was prepared.

EXAMPLE 3

Using p-methoxyaniline, 2,2-bis(ethylsulfonyl)vinyl-4-methoxyaniline, melting point 113°–114°C. was prepared.

EXAMPLE 4

Using p-aminotoluene, 2,2-bis(ethylsulfonyl)vinyl-4-methylaniline, melting point 129°–132°C. was prepared.

EXAMPLE 5

Using p-n-butylaniline, 2,2-bis(ethylsulfonyl)vinyl-4-n-butylaniline, melting point 82°–84°C. was prepared.

EXAMPLE 6

Using p-aminophenol, 2,2-bis(ethylsulfonyl)vinyl-4-hydroxyaniline, melting point 164°–166°C. was prepared.

EXAMPLE 7

Twelve grams (0.06 mole) of bis(ethylsulfonyl)methane, 8.7 grams (0.06 mole) of ethyl orthoformate, 3.2 grams (0.03 mole) of p-phenylenediamine and five drops of pyridine were mixed together and heated at 105°–170°C., distilling off the ethanol as formed. When evolution of ethanol ceased, the reaction mixture was cooled to a glassy solid. This was heated in 250 milliliters to provide a yellow solid which was filtered yielding 8.8 grams. This yellow solid was heated in 1800 milliliters of refluxing ethanol and filtered hot. On cooling, there was obtained 5 grams of N,N'-bis[2,2-bis(ethylsulfonyl)vinyl]p-phenylenediamine, a pale yellow solid, melting point 265°–268°C.

EXAMPLE 8

50-Mil thick plaques were prepared from 100 gram quantities of 100 parts rigid polyvinyl chloride (Geon 103-EP) containing 2 parts Thermolite 31 [a commercially available di-n-butyltin bis(isooctyl mercapto acetate)] heat stabilizer, 0.5 part stearic acid lubricant, and 0.5 part additive as identified in the following table, by dry blending the mixtures, milling on a standard two-roll laboratory mill for 5 minutes at 175°C., and compression molding at 180°C. To determine the effectiveness of these additives as light stabilizers, the plaques were exposed in a Xenon Weather-Ometer and the discoloration of the samples monitored with Hunter D25P transmission yellow index measurements. The results in the following table are reported in terms of the number of hours exposure resulting in a change in yellowness index ($\Delta YI$) of 10 units.

Table

| Additive | Xenon Weather-Ometer Hours to $\Delta YI = 10$ |
| --- | --- |
| Control - No Additive | 600 |
| Compound of Example 1 | 2900 |
| Compound of Example 2 | 2800 |
| Compound of Example 3 | 2800 |
| Compound of Example 4 | 3100 |
| Compound of Example 5 | 3000 |
| Compound of Example 6 | 2000 |
| Compound of Example 7 | 2800 |
| Comparative A | <400 |
| Comparative B | 780 |
| Comparative C | 1300 |
| Comparative D | 650 |
| Comparative E | 650 |
| Comparative F | 900 |

The comparative additives tested were:
A. 2,2-bis(ethylsulfonyl)vinyl-4-nitroaniline
B. 2,2-bis(ethylsulfonyl)vinyl-N-methylaniline
C. 2,2-bis(ethylsulfonyl)vinyl-4-methoxy-N-methylaniline
D. 2,2-bis(ethylsulfonyl)vinyl-cyclohexylamine
E. 2,2-bis(ethylsulfonyl)vinyl-n-butylamine
F. 2,2-bis(ethylsulfonyl)vinyl-piperidine The data in the foregoing table shows (a) the effectiveness of the compounds of Examples 1–7 as ultraviolet light stabilizers, (b) the ineffectiveness of similar compounds containing a nitro-substituent, Comparative A, (c) the undesirability of having the aniline nitrogen atom methylated, Comparative B and C (although Comparative C does produce useful stabilization), (d) the ineffectiveness of similar compounds based on aliphatic or cycloaliphatic amines, Comparative E and D, and (e) the low level of effectiveness of a compound based on a heterocyclic amine, piperidine, Comparative F.

I claim:

1. A polymeric composition stabilized against degradation by ultraviolet light by an effective amount of a compound of the formula:

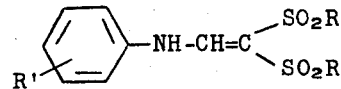

wherein R is alkyl of 1 to 12 carbon atoms or cycloalkyl of 5 or 6 carbon atoms and R' is alkyl, alkoxy, halogen, hydroxy, hydrogen, or

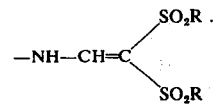

2. A composition as defined in claim 1 wherein R' is para to the —NH— moiety.

3. A composition as defined in claim 2 wherein R is ethyl.

4. A composition as defined in claim 3 wherein R' is lower alkyl, lower alkoxy, chlorine, hydrogen, or

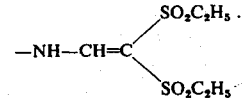

5. A composition as defined in claim 1 wherein said polymeric composition comprises a polymer selected from the group consisting of polyvinyl chloride, polyvinylidene chloride, and copolymers of vinyl chloride and vinylidene chloride.

6. A composition as defined in claim 5 wherein R' is para to the —NH— moiety.

* * * * *